United States Patent [19]

Ueno et al.

[11] Patent Number: 4,780,008

[45] Date of Patent: Oct. 25, 1988

[54] SYSTEM FOR SIMULTANEOUS CORRECTION OF DATA IN A TEXT MEMORY AND ON A PRINTOUT

[75] Inventors: Hideo Ueno, Nagoya; Keiko Yamada, Aichi, both of Japan

[73] Assignee: Brother Kogyo Kabushiki Kaisha, Aichi, Japan

[21] Appl. No.: 27,554

[22] Filed: Mar. 18, 1987

[30] Foreign Application Priority Data

Mar. 22, 1986 [JP] Japan .................................. 61-64393

[51] Int. Cl.[4] .......................... B41J 5/30; G06F 11/00

[52] U.S. Cl. .......................................... 400/63; 400/70; 400/697

[58] Field of Search ........................ 400/63, 70, 76, 61, 400/69, 74, 695, 697-697.1, 83

[56] References Cited

U.S. PATENT DOCUMENTS 4,130,884 12/1978 Hildinger .............................. 400/63
4,136,395 1/1979 Kolpek et al. ......................... 400/74
4,323,315 4/1982 Demonte et al. ..................... 400/63
4,564,301 1/1986 Veno ..................................... 400/63

FOREIGN PATENT DOCUMENTS 2016188 9/1979 United Kingdom .................. 400/76

*Primary Examiner*—David A. Wiecking
*Attorney, Agent, or Firm*—Barnes & Thornburg

[57] ABSTRACT

A printing apparatus with a text memory which is capable of correcting a data stored in a text memory wthout using a display mechanism is disclosed.

When a first write control means receives a memory print command during printing of the text memory data by a printing mechanism, data read from the text memory is written into a correction memory. A correction control means erases data commanded to be erased from the correction memory and stores the corrected data therein.

When a second write control means receives a command to release memory print stop, data of the correction memory, that is, data including the corrected data are written into the text memory.

4 Claims, 10 Drawing Sheets

SYSTEM FOR SIMULTANEOUS CORRECTION OF DATA IN A TEXT MEMORY AND ON A PRINTOUT

BACKGROUND OF THE INVENTION

Field of the Invention

The present invention relates to a printing apparatus with a text memory, more specifically, it relates to the printing apparatus which is capable of correcting text memory data without using a display mechanism such as a liquid crystal display, CRT and the like.

In the prior printing apparatus such as a typewriter, word processor or personal computer or the like, the display mechanism such as the liquid crystal display or the CRT are usually provided, in which while inputted data are displayed on the display, they are also stored in a correction memory and a text memory through the correction memory.

When correcting the data in the text memory, they are read out in the correction memory in parallel to displaying on the display for correction such as changing, erasing and adding as same as inputting, on the basis of the data displayed on the display mechanism.

On the contrary, many of the small and cheap typewriters are not even provided with the relatively expensive liquid crystal display, not to mention the CRT. If displays are not provided, text memory data can not be corrected even when the text memory is incorporated, therefore there is no merit to have the text memory. Accordingly in general, typewrites with no display unit are not provided with a text memory.

However, recently, due to advance in production techniques of high density integrated circuits and conspicuous trend to produce low cost semi-conductor memories of large capacity, it is possible to install the text memory in the small cheap typewriter, but since the liquid crystal display is not incorporated, the text memory data can not be displayed for the effective use thereof.

SUMMARY OF THE INVENTION

The object of the present invention is to provide a printing apparatus which is capable of correcting the text memory data without using a display mechanism.

As shown in a functional block diagram of FIG. 1, a printing apparatus with a text memory in accordance with the present invention is provided with an inputting means for inputting code data corresponding to characters and symbols and various command signals; a printing mechanism for printing a character or symbol corresponding to an inputted data on a print paper; correction means for correcting incorrectly printed characters and symbols a present position memory for storing the present position of a print head of the printing mechanism corresponding to each printed position; a correction memory for storing inputted data corresponding to each print position; and a text memory for storing inputted data via the correction memory.

The printing apparatus further comprises: (a) a first write control responsive to a memory print command for writing data from the text memory into the correction memory successively, when printing data of the text memory by the printing mechanism; (b) a correction control responsive to a memory print stop command during printing data of the text memory, for erasing both said incorrect characters or symbols printed on said print paper by said correction means and incorrect data corresponding to said incorrect characters or symbols in said correction memory in response to an erase command and for writing both correct characters or symbols newly inputted from said inputting means on said print paper by said printing mechanism and correct data corresponding to said correct characters or symbols into said correction memory; and (c) a second control means responsive to a release memory print stop command for writing said newly inputted data from said correction memory into an area in said text memory corresponding to said erased incorrect data.

Since the printing apparatus in accordance with the present invention is constituted as above, code data of characters, symbols and various command signals are inputted from the inputting means, and the characters, symbols or the like corresponding to the inputted data are printed on the print paper by the printing mechanism.

Also, the present position memory stores the present position of a print head of the printing mechanism corresponding to each the print position, the correction memory stores the inputted data corresponding to each print position, and the text memory stores the data via the correction memory. When the data of the test memory is printed by the printing mechanism according to a memory print command, the first control means writes data read out from the text memory into the correction memory.

As such, by the first write control means, the text memory data is written into the correction memory during a memory print stop command during printing of data from the text memory, it erases both incorrect characters or symbols printed on the print paper using the correction means and incorrect data corresponding to the incorrect characters or symbols in the correction memory according to an erase command, and writes both correct characters or symbols newly inputted from the inputting means on the print paper using the printing mechanism and correct data corresponding to the correct characters or symbols into the correction memory. When the second control means receives a command to release memory print stop, in responsive thereto the second control means writes newly inputted data of the correction memory into the corresponding area of the text memory.

As such, by the first control means, the data of the text memory is written into the correction memory during printing, next newly inputted characters or symbols are rewritten on the print paper and also the data of the correction memory is corrected by the correction control means, and next by the second control means, the corrected data of the correction memory is written into the text memory.

As explained hereinabove, when printing the text memory data, the data being printed is written into the correction memory, and the data of which can be written into the text memory after correcting the correction memory data, so that the text memory data may be corrected on the basis of the character, symbol and the like printed on the print paper without using the display mechanism such as the liquid crystal display, CRT and the like.

BRIEF DESCRIPTION OF THE DRAWINGS

FIGS. 2 through 6 show the embodiment of the present invention, in which FIG. 2 is a perspective view of an electronic typewriter, FIG. 3 is a plan view of a key board, FIG. 4 is a block diagram of a control system of a typewriter, FIG. 5(*a*) is an explanatory view schematically showing a part of data in a text memory in responsive to an address, FIG. 5(*b*) is an explanatory view schematically showing a printed word and its print position, and data and its address in a correction memory, FIG. 6(*a*) to (*e*) are flowcharts of a control routine 5 performed in a control unit of a printing apparatus.

DESCRIPTION OF THE PREFERRED EMBODIMENTS

An electronic typewriter embodying the present invention will be explained with reference to the drawings.

Figure 1:
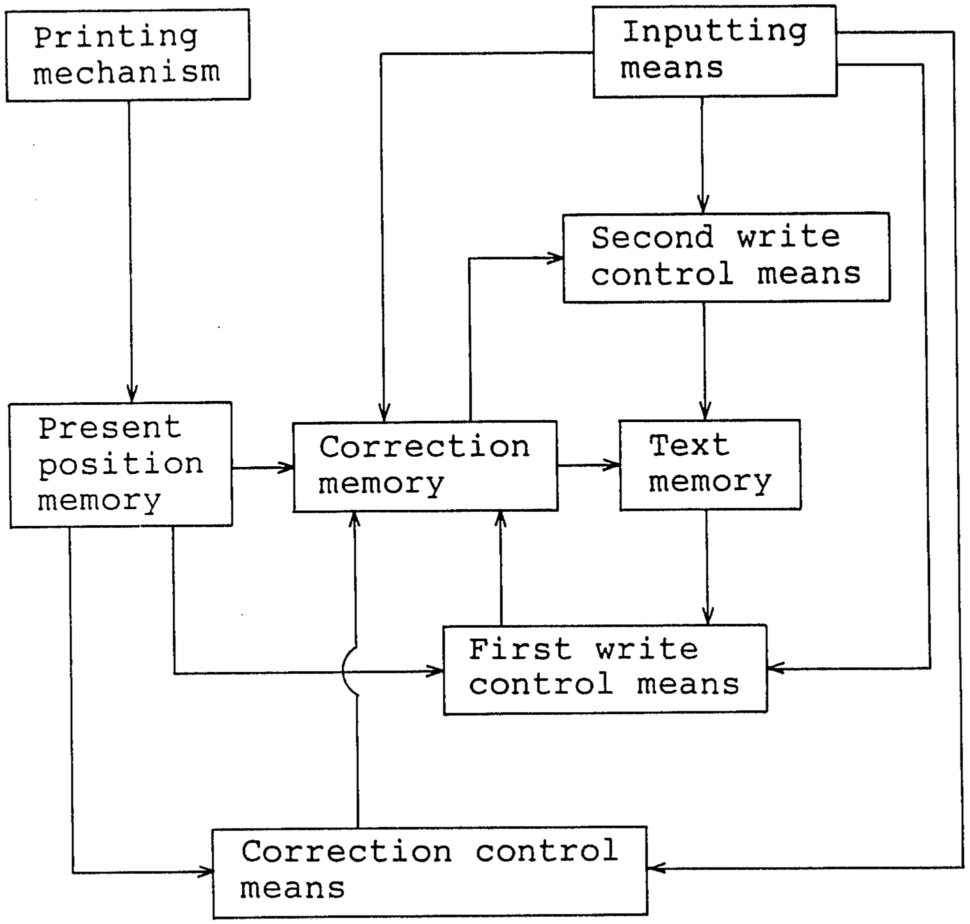
FIG. 1 is a functional block diagram showing configuration of the present invention.
Figure 2:
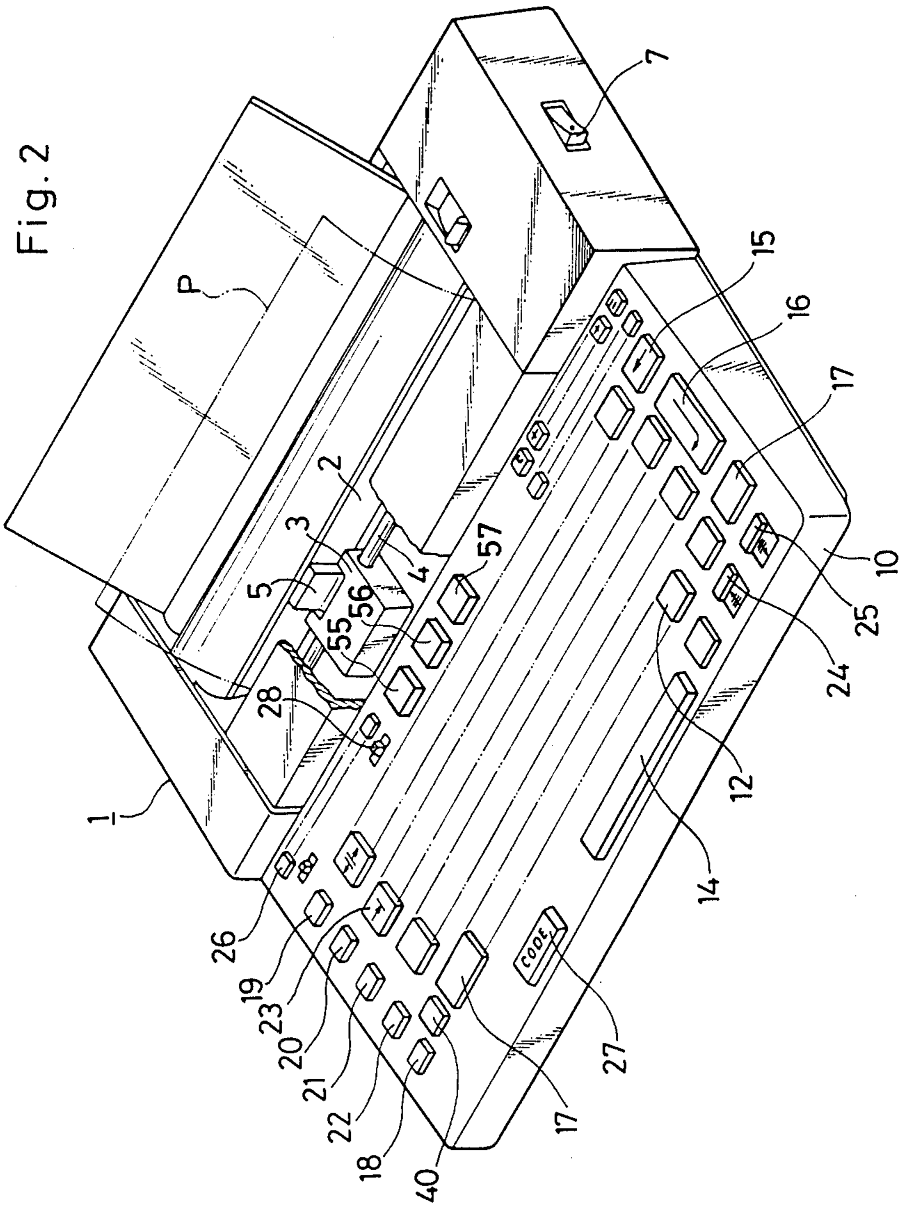
Figure 3:
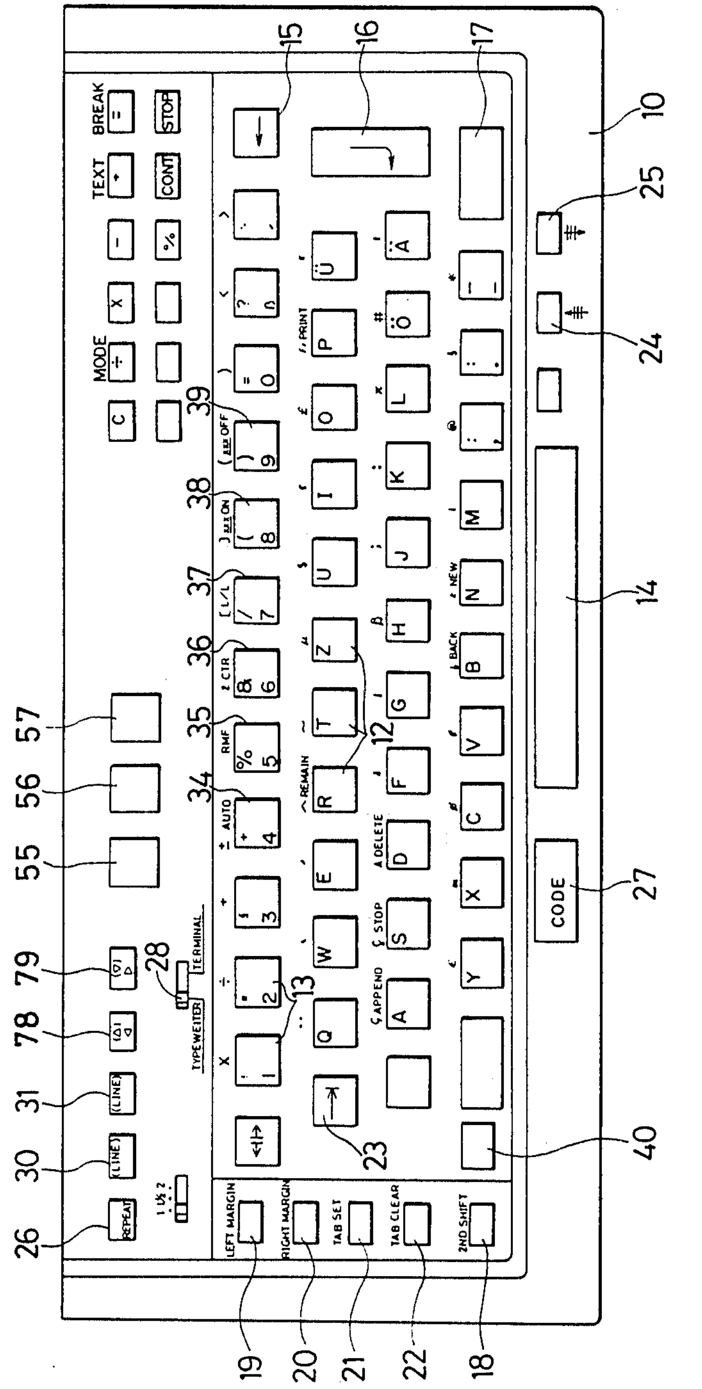

As shown in FIG. 2, on the rear side of a body case 1, a platen 2 is supported and, in the front thereof, a guide rod 4 extending in parallel to the platen 2 is arranged. On the guide rod 4, a carriage 3 is supported movably in both directions along the platen 2. On the carriage 3, a thermal head 5 is mounted, the position of which is adapted to be changed over between a print position where the thermal head 5 is pressed onto a print paper P in front of the platen 2, and a non-print position where the thermal head 5 is detached forwardly from the print paper P.

Also, in front of the body case 1, keyboard 10 is provided a whereon various keys, change-over switches and following operating members for operating the typewriter are arranged. That is, character-symbol keys including alphabetical keys 12 and numerical keys 13 and a space key 14, and back space key 15, a carriage return key 16, a shift key 17, a second shift key 18, a left margin set key 19, a right margin set key 20, a tab set key 21, a tab clear key 22, a tab key 23, a paper feed key 24, a paper return key 25, a repeat key 26, a code key 27, a mode selection switch 28, line keys 30, 31, numerical keys which also have control functions 34 through 39, an erase command key 40 for outputting an erase command, a memory print keys 55 for commanding print and print stop of the data of text memory 108, a memory print stop key 56 for commanding temporary print stop or print continuation of the data of text memory 108, a store mode key 57 for selecting whether or not the data of correction memory 106 is, stored in the text memory 108, cursory keys 78, 79 and the like, are arranged.

Though the erase command key 40 outputs the erase command signal to erase a word automatically, when it is operated together with the code key 27, the erase command signal for erasing a printed character is outputted. Also, the mode selection switch 28 is a dual position slide switch for selecting either of two modes of a typewrite mode and a terminal mode.

Furthermore, each of the memory print key 55, memory print stop key 56 and store mode key 57 is an ON/-OFF key for setting or resetting the mode of respective keys at every operation thereof.

Meanwhile, explanations on the other keys will be omitted because they are used in the ordinary typewriter.

Moreover, a carriage feed mechanism for moving the carriage 3 having the thermal head 5 in both directions, and a ribbon feed mechanism incorporated in the carriage 3 are similar to the construction (similar to that of the ordinary typewriter) disclosed in Japanese Patent Publication (nonexamined) No. 60-87085, wherein when the thermal head 5 moves to the printing direction at printing, a winding spool is rotated to wind a thermal transfer ribbon thereon, but when the thermal head 5 is moved in the reverse printing direction, the winding spool is arranged not to be rotated by retreating the thermal head 5 in the non-print position. Explanations on the other constructions will be omitted.

Meanwhile, the thermal transfer ribbon R is similar to the one disclosed in Japanese Patent Application No. 60-249762 applied by the applicant of the present invention, which is also applicable as a print ribbon and a correction ribbon.

Figure 4:
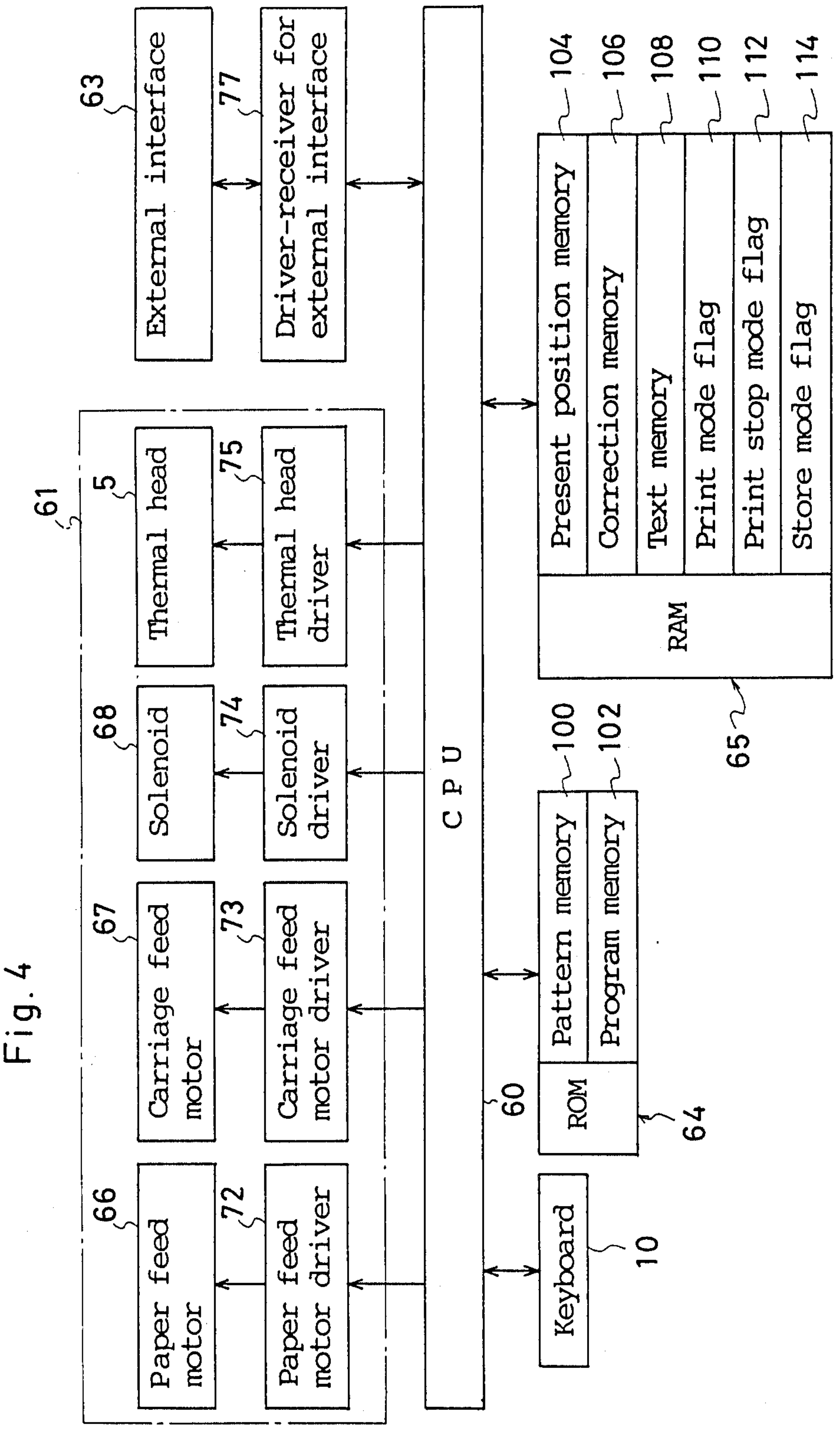

Next, a control unit of the electronic typewriter will be explained with reference to a block diagram of FIG. 4.

To a CPU (Central Processing Unit) 60, the printing mechanism 61, an external interface drive-receiver 77 connected to an external interface 63, a key-board 10, a ROM (Read Only Memory) 64, and a RAM (Random Access Memory) 65 are connected as shown in the diagram.

The printing mechanism 61 comprises a paper feed motor 66 for driving a paper feed roller and a paper feed motor driver 72, a carriage feed motor for 67 moving the carriage 3 and a carriage feed motor driver 73, a solenoid 68 for changing over the thermal head 5 selectively between the print position and the nonprint positions and a solenoid driver 74, the thermal head 5 and a thermal head driver 75 etc.

Also, the ROM 64 comprises a pattern memory 100 in which pattern data for each character and symbol are stored, and a program memory 102 in which a control program for controlling the printing mechanism 61 and a control program for character erasing to be described later and a control program for correcting the data of text memory 108 are stored.

The RAM 65 is provided with, at least a present position memory (print position pointer) 104 for storing the present position of the thermal head 5 so as to correspond to each print position on the print paper P, a correction memory 106 for storing one print line of code data inputted from the key board 10 so as to correspond to each print position, a text memory 108 for storing the whole code data inputted from the key board 10, a print mode flag 110 which is set at print mode by writing 1, a print stop mode flag 112 which is set at the print stop mode (mode for temporarily stopping the print) by writing 1, a store mode flag 114 which is set at the store mode (mode for reading inputted code data from the correction memory 106 to store in the text memory 108) by writing 1. and various temporary memories necessary to control the printing mechanism 61.

The CPU stores the code data corresponding to each character and symbol such as alphabets, numerals, spaces and the like inputted from the character-symbol key of the key board 10 into the correction memory 106 of the RAM 65 successively, and reads out the pattern data corresponding to these inputted code data from the pattern memory 100 of the ROM 64 successively to output to the thermal head driver 75 and the carriage feed motor driver 73.

Furthermore, the CPU 60 processes the code data inputted from various function keys of the key board 10 with the control program read out from the program memory 102 of the ROM 64, to output the control signal corresponding to the inputted code data to the paper feed motor driver 72, carriage feed motor driver 73 and solenoid driver 74.

Figure 5:
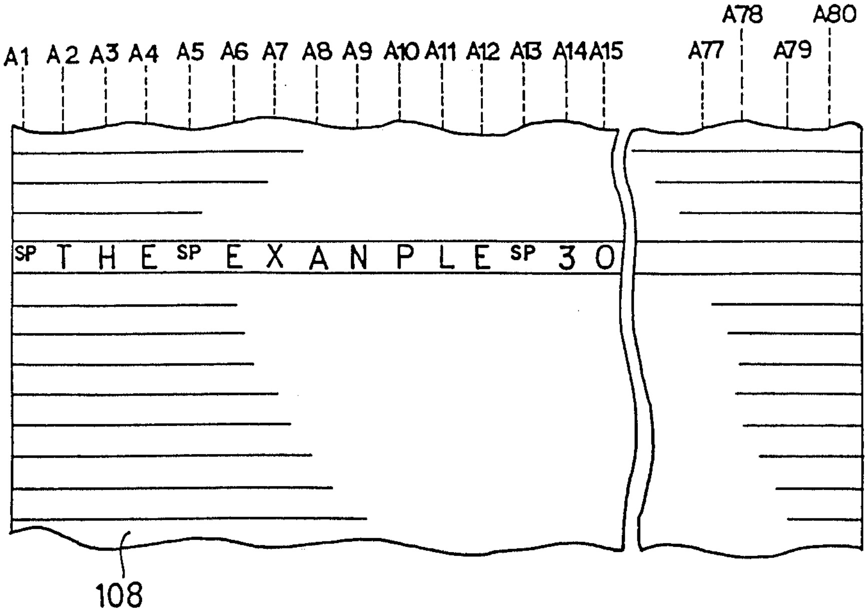
Figure 5:
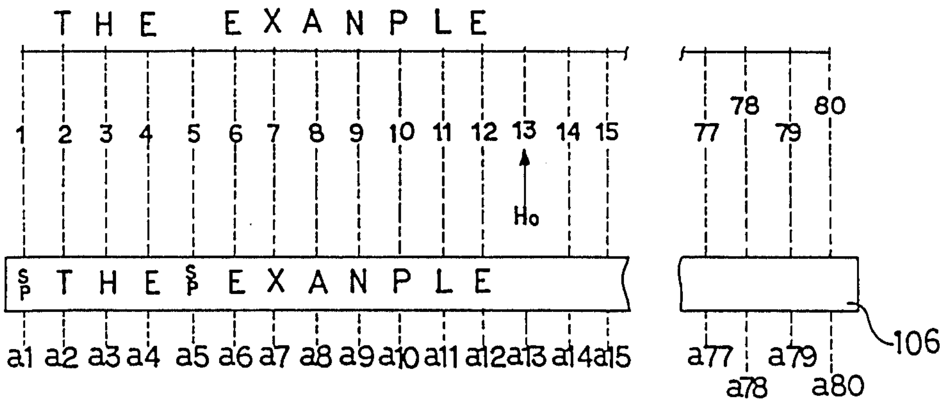

Next, an automatic word erase control, which is started by operating the erase command key 40, for automatically erasing of wrongly printed printed word will be generally explained with reference to FIG. 5(*b*). FIG. 5(*b*) schematically shows the word wrongly spelled as "THE EXANPLE" and data in the input data memory.

For example, when erasing the wrong word "EXANPLE", in the state where the thermal head 5 is located at Ho of the 13th digit or at either of the print positions between 6th and 12th digits, the erase command key 40 is operated to output the erase command to the CPU 60.

In the CPU 60, on the basis of word erase control program stored in the program memory 102 of the ROM 64 and using data from the present position memory 104 and correction memory 106 of the RAM 65, the print position of a head character of the wrong word "EXANPLE" is detected, then after moving the thermal head 5 to the head character position, "EXANPLE" is printed duplicately on the wrong word "EXANPLE" to erase it successively. At the same time, at every erasing of each print character, the CPU 60 erases the data in the correction memory 106 corresponding to each erased character.

As such, in parallel to erasing of the wrong word "EXANPLE", the data of "EXANPLE" in the correction memory 106 is erased. Then, after erasing of the wrong word "EXANPLE", the thermal head 5 is returned to the head character of the wrong word, from which the correct spelling can be reprinted.

Also, when erasing only one character "N" of the wrong word, the thermal head 5 is moved to the 9th digit by the back space key 15, and the erase command key 40 and the code key 27 are operated to output the erase command to the CPU 60, thereby the wrong character "N" is erased and the data in the correction memory 106 corresponding to the erased character "N" is erased. Thereafter, a correct character can be reprinted.

By the way, the present invention is applicable to the typewriter including the text memory 108 but no display mechanism such as the liquid crystal display or the like, is characterized by a memory data correction control which is capable of correcting data in the text memory 108, which will be explained generally so that description of a flowchart can be understood more easily.

In this typewriter, code data inputted from the keyboard 10 is stored successively in the address of the correction memory 106 corresponding to each print position in parallel to printing on the print paper P with the printing mechanism 61. Then, when the store mode is set, one print line of code data of the correction memory 106 is stored successively in the successive area of text memory 108 at every operation of the carriage return key 16 on the key board 10.

For example, as shown in FIG. 5(*a*), in a certain line of the text memory 108, respective data are stored in the address (Al–A80) as "THE EXANPLE 30 ---". Also, in address Al, A5 and A13, space codes (SP) are stored and in the address A16 (not shown), the carriage return code is stored.

Also, when printing data of the text memory 108, it is effected by operating the memory print key 55 to set the print mode. At the same time, the CPU 60, at every output of each code data from the text memory 108 to the printing mechanism 61, stores the respective code data successively in the correction memory 106, and when the carriage return code is outputted from the text memory 108, writes the one line of code data stored in the correction memory 106 into the corresponding area (address) of the text memory 108.

At this time, as shown in FIGS. 5(*a*) and (*b*), a first digit of the print position and a head address al of the correction memory 106 as well as the latter and a head address Al of the text memory 108 are in correspondence with each other.

In succession, the data of test memory 108 is printed, but the print is stopped by the memory print stop key 56 when "EXANPLE" inputted in a wrong spelling is printed. Then "EXANPLE" is erased with the automatic word erase control or the wrong character "N" is erased with the erase command key 40 and the code key 27, then reprinted in a correct spelling.

Simultaneously, the CPU 60 erases data in the correction memory 106 corresponding to each erased character and writes data corresponding to each corrected character into the correction memory 106.

Next, when the memory print stop key 56 is reoperated to release the print stop mode, corrected data of the correction memory 106 is written into the corresponding position (address) of the text memory 108 and thus data in the text memory 108 is corrected.

Figure 6:
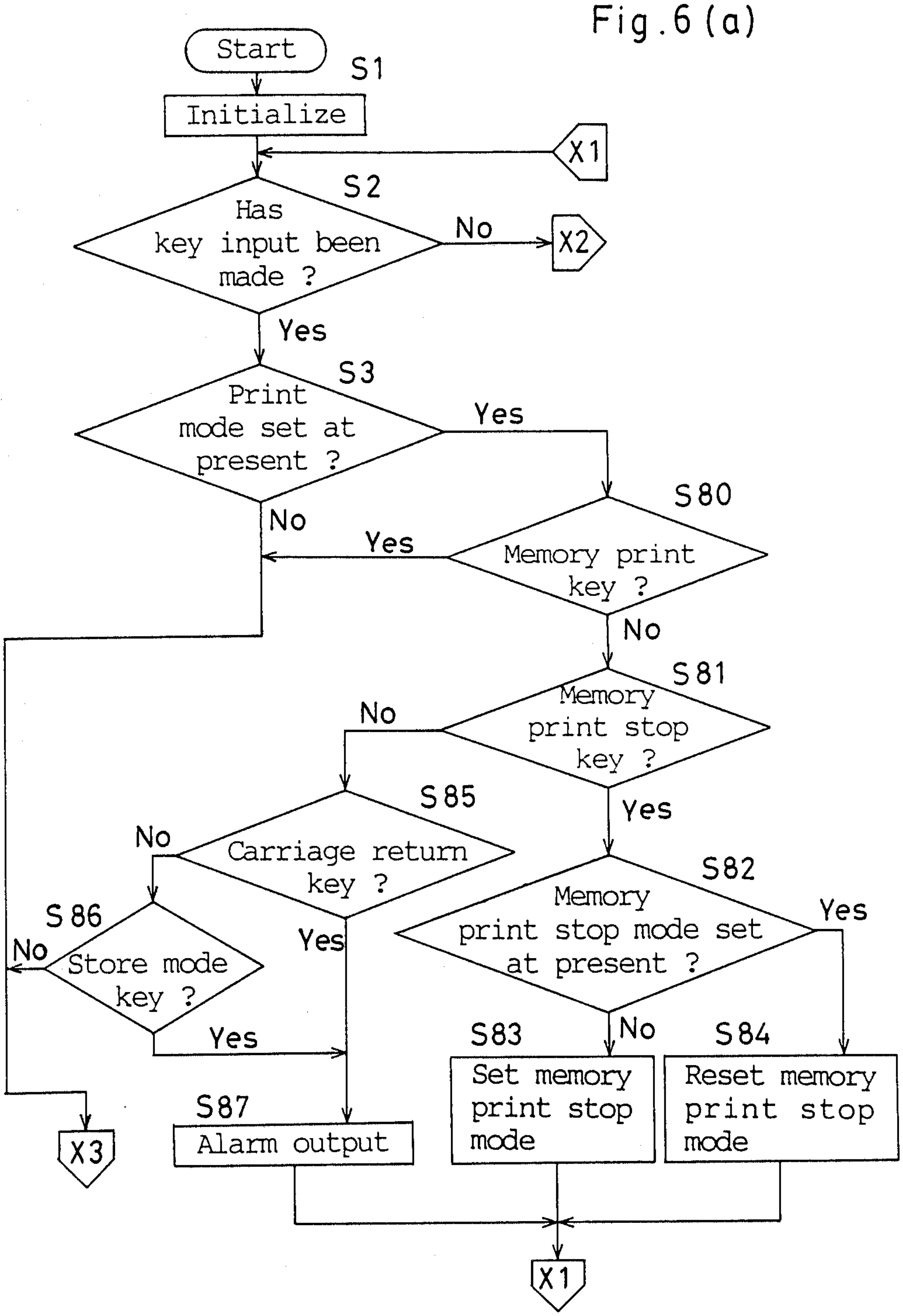
Figure 6:
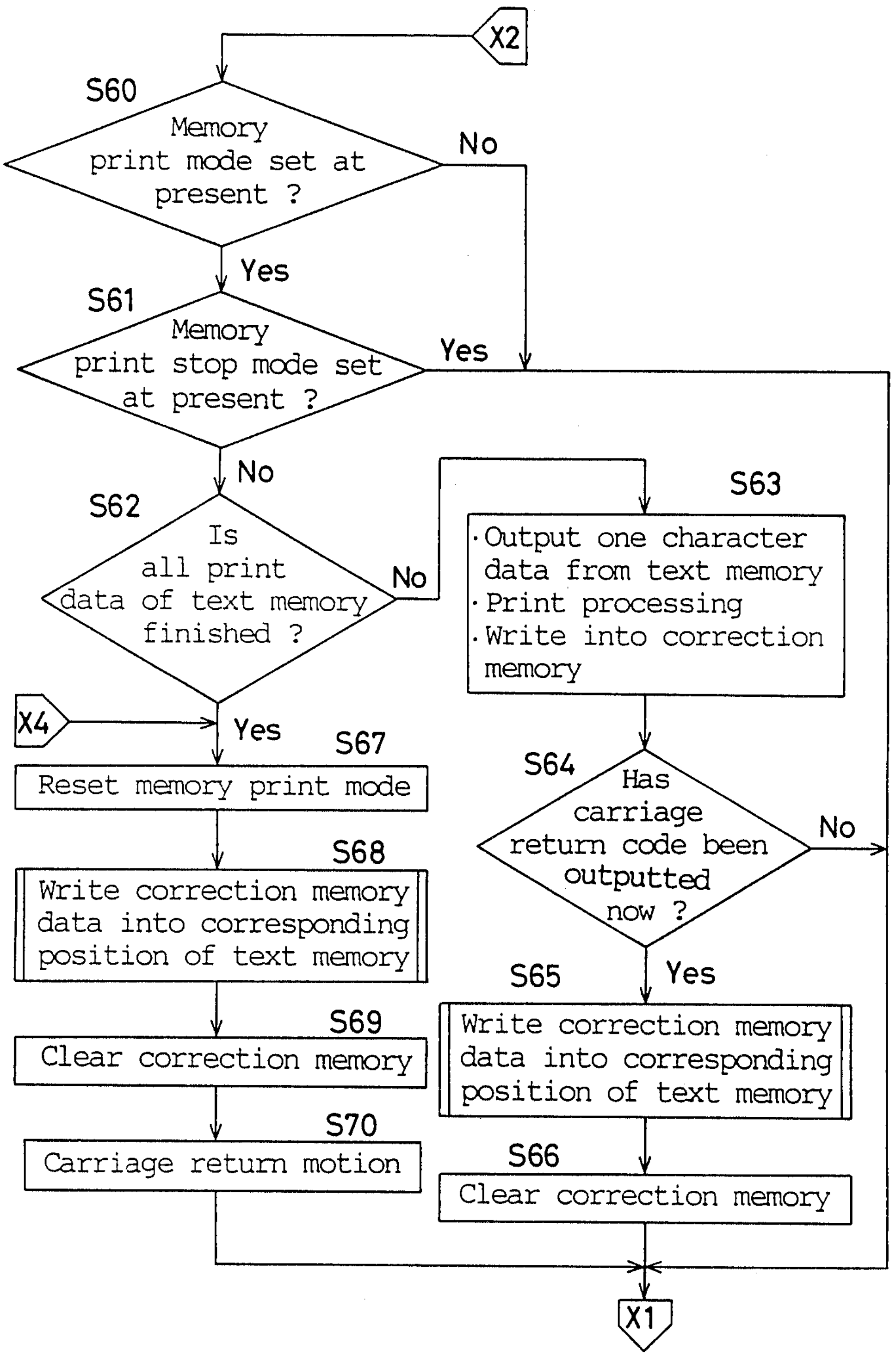
Figure 6C:
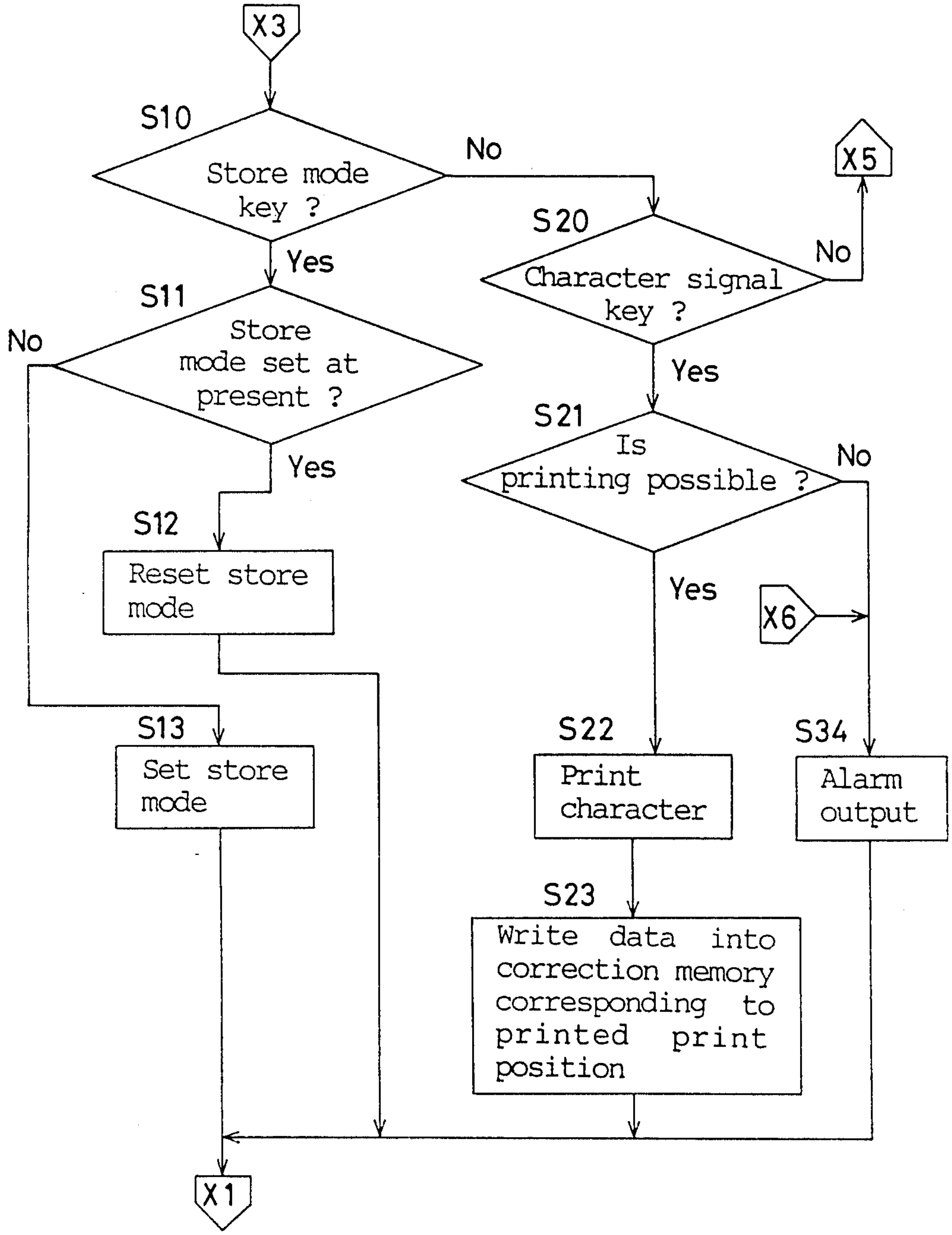
Figure 6:
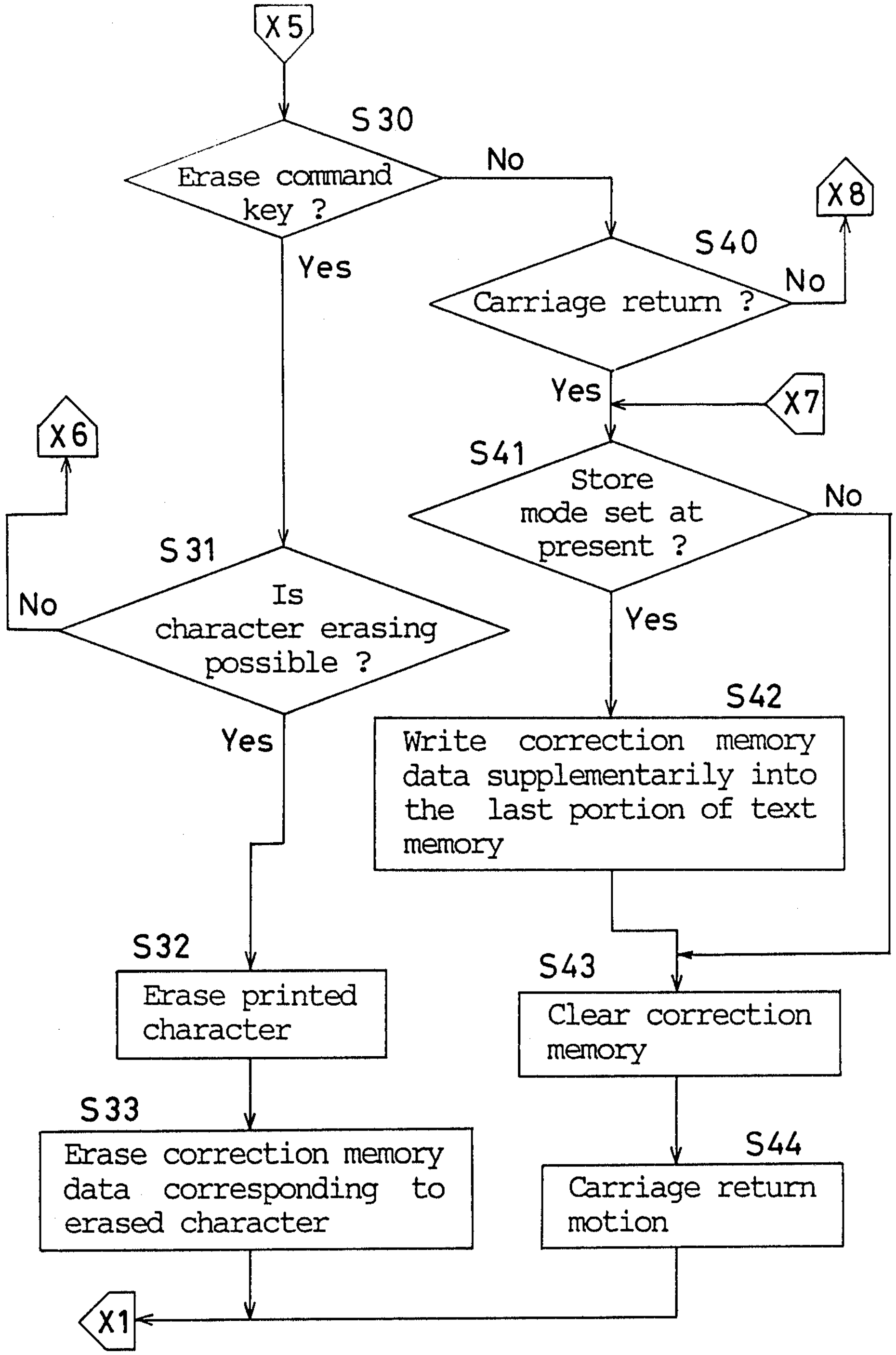
Figure 6E:
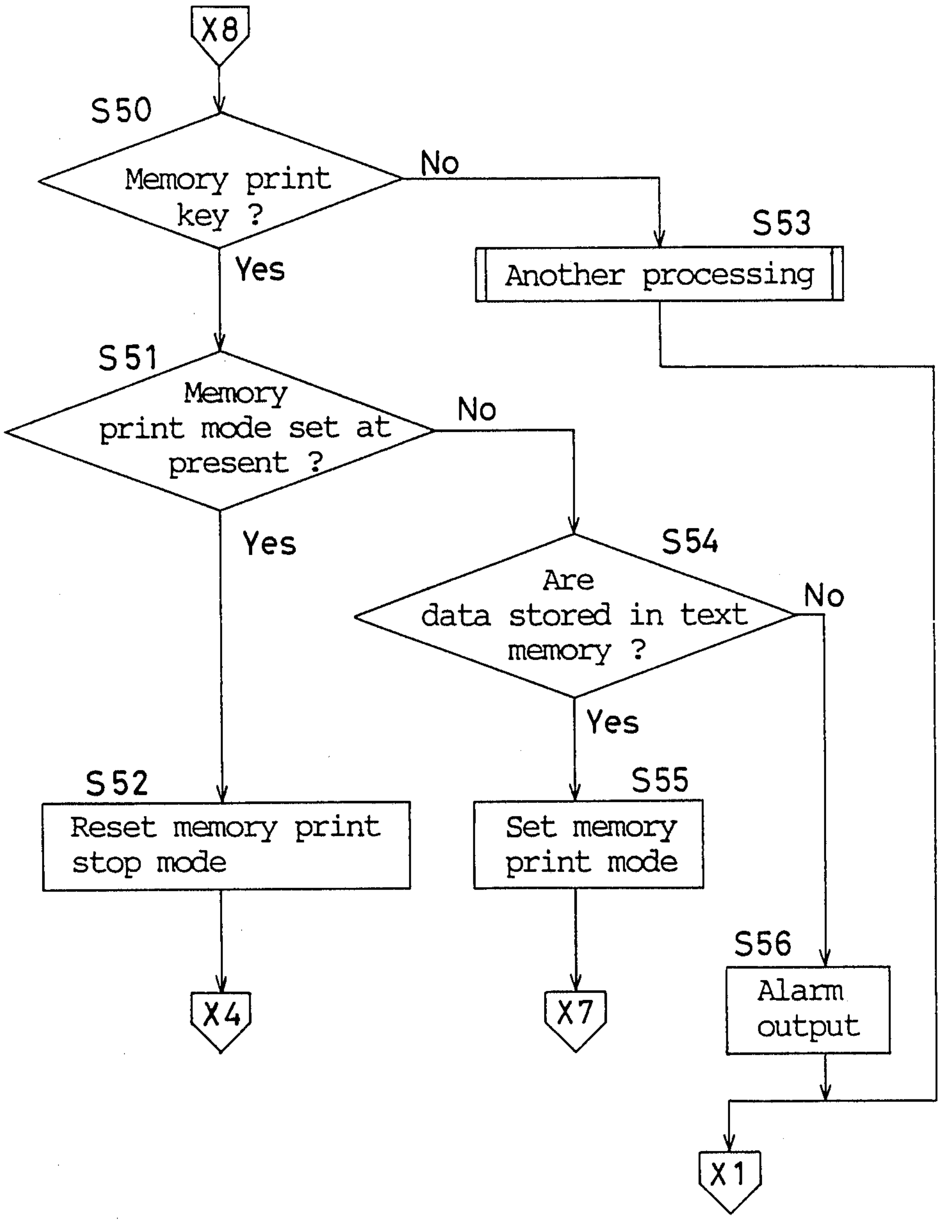

Now, a memory data correction control routine performed in the control unit of the electronic typewriter will be explained with reference to the flow charts of FIG. 6(*a*) to FIG. 6(*e*).

As soon as the electronic typewriter is energized to start control, initialization is executed in step S1 (hereinafter, represented merely by S1, the same holds true for the other steps). In S2, it is determined whether or not a key input has been made (whether or not a key is operated), when any key is not operated, it moves to S60, and to S3 if the key is operated.

In S3, it is determined whether or not the memory print mode is set at present on the basis of the print mode flag 110 of the RAM 65, if yes, processing moves to S80, if no, to S10.

Following S10–S13 are steps related to the store mode, in S10 it is determined whether on not the key operated in S2 is the store mode key 57, if yes, processing moves to S11. S11–S13 are steps for operating the store mode key 57 ON and OFF, in step S11, it is determined whether or not the store mode is set at present on the basis of the store mode flag 114 of the RAM 65, if yes, in next step S12, 0 is written into the store mode flag 114 to reset the store mode and to return to S2. Also, when the store mode is not set, processing moves to S13, where 1 is written into the store mode flag 114 to set the store mode and to move to S2.

Meanwhile, when conclusion is No in Step 10, that is, the key operated in S2 is not the store mode key 57, processing moves to S20. S20–S23 are steps for printing as inputting data, in S20, it is determine whether or not the key operated in S2 is the character symbol key, if yes, next S21 is executed, if no, processing moves to S30.

In S21, it is determined whether or not printing is possible on the basis of data of the present position memory 104 and the right margin set position, if possible, the character or symbol corresponding to code data inputted is printed in next step 22. At this time, the CPU 60 outputs the control signal to the thermal head driver 75 and carriage feed motor driver 73 of the printing mechanism, on the basis of data of the pattern memory 100 of the ROM 64 and the control program for printing.

Next, in S23, code data is written into the address of the correction memory 106 corresponding to the print position printed in S22 on the basis of the data of the present position memory 104, and processing returns to S2.

Also, when conclusion is NO in S21, that is, when printing is not possible, in S34 a buzzer or alarm is outputted, and processing returns to S2.

Following S30–S33 are steps related to character erasure, in S30, it is determined whether or not the key operated in S2 is the erase command key 40, if yes, processing proceeds to S31, if NO, to S40.

In S31, it is determined whether or not character erasing is possible (whether or not the data to be erased is stored in the correction memory 106), if possible, processing moves to S32 and erasing of wrongly printed character is executed. At this time, the CPU 60 reads the word erase control program from the program memory 102, and outputs the control signal to the thermal head driver 75 and carriage feed motor driver 73 of the printing mechanism 61 on the basis of data of the present position memory 104 and the correction memory 106.

Then, in next S33, data of the correction memory 106 corresponding to the character erased in S32 is erased and processing returns to S2.

When the code key 27 and erase command key 40 are operated simultaneously, the wrong print is erased by one character as similar to S30–S33.

Meanwhile, when conclusion is NO in S31 (character erasing is not possible), processing returns to S2 after moving to S34 and executing alarm output.

Following S40–S44 are steps where the carriage return key 16 is operated to write data of the correction memory 106 into the text memory 108, in S40, it is determined whether or not the key operated in S2 is the carriage return key 16, if yes, processing moves to S41, if no, if moves to S50.

In S41, it is determined whether or not the store mode is set at present on the basis of the store mode flag 114, if yes, processing moves to S42 where the data of the correction memory 106 is written into the last portion of the text memory 108 in addition. When it is not set, processing moves to S43.

Next, in S43, the correction memory 106 is cleared and in S44, the carriage return is operated (the thermal head 5 is moved to the uppermost digit on the left margin side and the print paper P is fed by one line), and processing returns to S2. In this case, the CPU 60 outputs the control signal to the carriage feed motor driver 73 and the paper feed motor driver 72 of the printing mechanism 61.

In S50, it is determined whether or not the key operated in S2 is the memory print key 55, if yes, processing moves to S51, if no, it moves to S53, and processing corresponding to the function key operated in S2 is executed and returns to S2.

Following S51–S55, S67 are steps for operating the memory print key ON and OFF, in S51, it is determined whether or not the memory print mode is set at present on the basis of the print mode flag 110, if yes S52 is executed. In S52, the print stop mode is not needed to be set because of resetting the memory print mode in next S67, the memory print stop mode is reset by writing 0 into the print stop mode flag 112, and processing moves to S67 were the memory print memory is reset.

In S54, it is determined whether or not data to be printed is stored in the test memory 108, if yes, processing moves to S55, if no, it moves to S56 to actuate the buzzer or to alarm on an alarm lamp, and in S55, the memory print mode is set by writing 1 into the print mode flag 110 on condition that data is present in the text memory 108, and processing moves to S41, by executing S41–S44 and considering that end of the data inputted from the key board 10 is not finished with the carriage return code, data in the correction memory 106 is written into the text memory 108 in addition and processing moves to S2 after executing carriage return operation.

By the way, the memory print mode is set in S55 and processing moves to S2 via S41–S44, when it is determined in S2 that the key is not inputted, it moves to S60 from S2.

S60–S70 are steps for printing data of the text memory 108, in S60, on the basis of the print mode flag 110, it is determined whether or not the memory print mode is set at present, if yes, processing moves to S61 and if no, it returns to S2.

When any key is not operated soon after the typewriter has been energized, S2 and S60 are repeated at every fine period of time.

In S61, on the basis of print stop mode flag 112, it is determined whether or not the memory print stop mode is set at present, if yes, processing returns from S61 to S2 to stop printing, and if no, it proceeds to S62, where it is determined whether or not print of all data written in the text memory 108 is completed. When the print is not completed, processing moves to S63 and if the print is completed, it moves to S67.

In S63, the code data of one character is outputted from the text memory 108 and the character is printed and its code data is written into the correction memory 106 correspondingly to the print position of the character.

In next S64, it is determined whether or not the code data outputted now in S63 is the carriage return code, if yes, processing moves to S65 and if no, it returns to S2.

In S65, data for one line of the correction memory 106 is rewritten into the corresponding position (address) of the text memory 108, and in next S66, the correction memory is cleared and processing returns to S2. That is, S2, S60–S62, S63–S64 are repeated, data for one line of the text memory 108 is printed and written in the correction memory 106, then data for one line written in the correction memory 106 in S65 is rewritten into the corresponding position of the text memory 108.

When all data of the text memory 108 have been printed, processing moves from S62 to S67, where the memory print mode is reset by writing 0 into the print mode flag 110 as printing of the text memory 108 is completed. Also, in next S68, data of the correction memory 106 is rewritten into the corresponding position (address) of the text memory 108, and in S69, the correction memory 106 is cleared. Furthermore, in next S70, as the carriage return code might be not inputted to the end of data of the text memory 108, carriage return operation is executed and processing returns to S2.

When the wrong word is found during printing data of the text memory 108 as aforementioned, the correct word is printed after erasing the word by executing the following steps, and the correct data is stored in the text memory 108 through the correction memory 106.

That is, first if the memory print stop key 56 is operated, processing moves to S80 via S2 and S3. In S80, it is determined whether or not the key operated in S2 is the memory print key 55, if yes, processing moves to S10, and if not, it moves to S81. In S81, it is determined whether or not the key operated in S2 is the memory print stop key 56, if yes, it moves to 82.

Following S82–S84 are steps for operating the memory print stop key 56 ON and OFF, in S82, on the basis of the print stop mode flag 112, it is determined whether or not the memory print stop mode is set at present, if no, S83 is executed to set the memory print stop mode by writing 1 into the print stop mode flag 112.

Also, when the memory print stop mode is set at present, it proceeds to S84 and by writing 0 into the print stop mode flag 112, the memory print stop mode is reset.

As aforementioned, when the memory print stop key 56 is operated, processing returns to S2 via S3, S80–S83, thus, S2, S60–S61 are repeated to stop printing.

Next, when the back space key 15 is operated, processing moves to S53 via S3, S80, S81, S85 and S86 to back space the thermal head 5. Similarly, after erasing the wrong word through steps S30–S33 by operating the erase command key 40, the character-symbol key is operated to print the correct word character and to write its code date into the correction memory 106 by steps S20–S23.

When the memory print stop key 56 is operated, processing moves to S84 via S2, S3, S80 and S82, whereby the memory print stop mode is reset. Then, processing moves to S61 through S84, S2 and S60, from which it moves to S62 as the memory print stop mode is reset, and printing of data of the test memory 108 is started again.

Also, when conclusion is NO in step S81, that is, the key operated in S2 is not the memory print stop key 56, S85 is executed and it is determined whether or not the key operated in S2 is the carriage return key 16, if yes (when the memory print mode is set and the carriage return key 16 is operate during printing), it moves to S87 to actuate the buzzer or to alarm on the alarm lamp, and if no, it moves to S86.

In S86, it is determined whether or not the key operated in S2 is the store mode key 57, if yes (when the memory print mode is set and the store mode key 57 is operated during printing), processing moves to S87 to actuate the buzzer or to alarm on the alarm lamp, and if no, it moves to S10.

As described hereinabove, when preparing the text by inputting documents with the typewriter, if the store mode is selected by the store mode key 57, the inputted text is stored in the text memory 108 via the correction memory 106 (S20–S23, S40–S44).

When printing the text stored in the text memory 108, it can be printed out by operating the memory print key 55 (S50 -S56, S60–S70). At this time, data of the text memory 108 is printed on the print paper P as well as written into the correction memory 106 line by line successively and cleared (S63–S65).

When correcting data in the text memory 108, data of the text memory 108 is printed on the print paper P as mentioned above, then after the character or word to be corrected is printed, the memory print stop key 56 is operated to stop printing (S81–S84, S61).

Next, if necessary the back space key 15 is operated to move the thermal head 5 to the print position to be corrected, then if the erase command key 40 is operated to erase the word or character, corresponding data in the correction memory 106 is also erased (S30–S33).

When the desired character or symbol is printed on the print position to be corrected, its code data is also written into the correction memory 106 (S20–S23), then if the memory print stop key 56 is operated again printing is restarted, whereby data of the correction memory 106 is written into the corresponding position of the text memory 108 by one print liner successively, thereby data of the text memory 108 may be corrected (S81–S84, S68–S70).

By the way, through the above embodiment has been explained for the typewriter provided with a character erase mechanism, the present invention is also applicable to the typewriter without the character erase mechanism. That is, after the character to be corrected has been printed, by using the input code data or the like from the space key 14, data in the correction memory 106 may be made erasable so as to be corrected by printing the correct character on the character to be corrected in duplication after erase. This is because that the desired printed test can be obtained if all data of the text memory 108 are reprinted after its data have been corrected.

Also, though the typewriter provided with the thermal printing apparatus has been explained in the above embodiment, it will be appreciated that the present invention is also applicable to the typewriter provided with a daisy wheel printing apparatus or a type ball printing apparatus.

What is claimed is:

1. A printing apparatus having:

an inputting means for inputting code data corresponding to the characters and symbols and various command signals;

a printing mechanism with a print head for printing said characters or symbols corresponding to said inputted code data on a print paper at print positions;

a correction means for correcting said characters or symbols incorrected printed on said print paper by said print head;

a position memory for storing the position of said print head corresponding to each print position of said characters or symbols;

a correction memory for storing said inputted data corresponding to said each print position; and a text memory for storing said inputted data via said correction memory;

said printing apparatus further comprising:

a first control means responsive to a memory print command for writing data from said text memory into said correction memory successively, and for causing said printing mechanism to print characters or symbols corresponding to said data from said text memory until stopped by a memory print stop command;

a correction control means responsive to a memory print stop command during printing of data from said text memory, for erasing from said paper by said correction means said incorrect characters or symbols printed on said print paper and for erasing from said correction memory incorrect data corresponding to said incorrect characters or symbols in response to an erase command and for writing correct characters or symbols corresponding to code data newly inputted from said inputting means on said print paper by said printing mechanism and for writing said code data corresponding to said correct characters or symbols into said correction memory; and a second control means responsive to a release memory print stop command for writing said newly inputted data from said correction memory into an area in said text memory corresponding to said erased incorrect data and resuming printing from said text memory.

2. A printing apparatus in accordance with claim 1, wherein said correction memory stores data of one print line printed by said printing mechanism and each address of said data in said correction memory so as to correspond to said each print position of said characters or symbols in said one print line.

3. A printing apparatus with a text memory in accordance with claim 1, wherein said printing mechanism is electronically controlled by a CPU, ROM, and RAM.

4. A printing apparatus with a text memory in accordance with claim 1, wherein said inputting means comprises at least a memory print key, a memory print stop key and an erase command key

* * * * *